United States Patent
Moslehi et al.

(10) Patent No.: US 11,598,678 B1
(45) Date of Patent: Mar. 7, 2023

(54) DISTRIBUTED TEMPERATURE SENSOR WITH SHORTENED SENSING REGIONS

(71) Applicant: Intelligent Fiber Optic Systems, Inc., San Jose, CA (US)

(72) Inventors: Behzad Moslehi, Los Altos, CA (US); Mehrdad Moslehi, Los Altos, CA (US)

(73) Assignee: Intelligent Fiber Optic Systems, Inc., San Jose, CA (US)

( * ) Notice: Subject to any disclaimer, the term of this patent is extended or adjusted under 35 U.S.C. 154(b) by 593 days.

(21) Appl. No.: 16/718,113

(22) Filed: Dec. 17, 2019

(51) Int. Cl.
  *G01K 11/32* (2021.01)
  *H01S 3/30* (2006.01)
  *G01K 11/324* (2021.01)

(52) U.S. Cl.
  CPC .............. *G01K 11/32* (2013.01); *H01S 3/302* (2013.01); *G01K 11/324* (2021.01)

(58) Field of Classification Search
  None
  See application file for complete search history.

(56) References Cited

U.S. PATENT DOCUMENTS

| | | | | |
|---|---|---|---|---|
| 5,217,306 A | * | 6/1993 | Wada | G01K 11/32 374/161 |
| 2014/0254629 A1 | * | 9/2014 | Shida | G01K 11/32 374/161 |

* cited by examiner

*Primary Examiner* — Chad H Smith
(74) *Attorney, Agent, or Firm* — File-EE-Patents.com; Jay A. Chesavage (57) ABSTRACT

A distributed temperature sensor system has a pulsed laser coupled to a circulator, the circulator having a laser input and coupling energy to an optical reference coil in series with a measurement fiber having loops or helical turns, the circulator having a backscatter signal port coupling backscattered reflections from the measurement fiber. The backscatter signal port is coupled to a switch and mux, the switch and mux selecting either an anti-Stokes filter or a Stokes filter, the output of the mux coupled to a photodetector, the photodetector coupled to a histogram processor synchronized to the pulsed laser enable. The histogram processor uses the anti-Stokes and Stokes histogram counts associated with a sensor region to estimate a temperature of that sensor region.

10 Claims, 6 Drawing Sheets

*Figure 1A*
Distributed Temperature Sensor system

*Figure 1B*
Distributed Temperature Sensor system

Figure 2
DTS fiber backscatter

Figure 3
DTS waveforms

*Figure 4*
temp response detail

*Figure 5*
Borehole Temperature Measurement

*Figure 6*
Photon Count histogram
anti-Stokes / Stokes

DISTRIBUTED TEMPERATURE SENSOR WITH SHORTENED SENSING REGIONS

FIELD OF THE INVENTION

The present invention relates to the detection and measurement of temperature distribution in an optical fiber. More specifically, the invention relates to the use of a spatially distributed temperature sensor which uses Raman Stokes and anti-Stokes backscattering signals to measure a temperature distribution profile along an optical fiber, including in spatially-resolved localized regions, with enhanced spatial resolution.

BACKGROUND OF THE INVENTION

Raman back-scattered distributed temperature sensing (DTS) systems measure temperature distribution along the length of a fiber-optic sensing cable. A Distributed Temperature Sensing system measures the distributed temperature profile along the sensing fiber. A Raman DIS temperature measurement system uses a pulsed laser source to send repetitive short (typically on the order of a fraction of nanosecond to over 10 nanosecond pulse duration, also known as pulse length or pulse width) pulses of light at a given center wavelength (typically a center wavelength chosen in the visible to infrared spectral region) into the sensing optical fiber. As the light pulse travels along the optical fiber, a small fraction of the traveling laser optical pulse energy is Raman backscattered in a counter-propagating direction along the fiber length and back to the optical input port. The backscattered light is measured over time and analyzed to extract the distributed temperature profile of the optical fiber, with a spatial resolution on the order of a fraction of 1 meter to several meters (typically a spatial resolution of about 1 meter is obtained in the prior art DTS systems). The DTS sensing fiber is typically a multi-mode fiber although single-mode sensing fibers may also be used for Raman DTS. A DTS system can use fiber lengths of a few kilometers to as long as tens of kilometers.

There are several limitations to the prior art Raman DTS approach. A primary shortcoming is the DTS spatial resolution, which is typically on the order of 0.5 meter or longer, making the DTS measurement unsuitable for high-resolution shorter extents of localized measurements. Another limitation is the inability to make a plurality of position-specific localized measurements on a single length of optical fiber. It is desired to provide a method and apparatus for making multiple temperature measurements over comparatively short measurement extents than available in the prior art.

OBJECTS OF THE INVENTION

A first object of this invention is an apparatus for the detection and measurement of local temperature and temperature distribution profile along an optical fiber serving as a temperature sensor, the apparatus having a pulsed laser light source generating a time-domain series of short optical pulses with a specified pulse repetition rate, an optical circulator having an input port coupled to the pulsed laser source and coupling the optical pulse from the optical circulator input port to a bidirectional circulator port, the bidirectional circulator port coupled to a reference fiber coil and to the optical sensor fiber having sensing regions formed as loops, cylindrical, or helical regions for shortened axial length (or for creating a large fiber coil length to axial length ratio), the circulator also having a signal port for coupling backscattered optical power from the bidirectional circulator port to one or more photon counters or ultra-sensitive photodetectors operative to receive Stokes wavelengths through a Stokes optical filter during one interval, and to receive anti-Stokes wavelengths through an anti-Stokes optical filter during the same or different time interval, the Stokes and anti-Stokes filters coupled to one or more photon counters or ultra-sensitive photodetectors, the one or more photon counters or ultra-sensitive photodetectors coupled to a respective histogram signal processor for repetitively counting photon events (or measuring the corresponding Stokes and anti-Stokes optical signal intensities) into a plurality of histogram count bins which aggregate photon or photodetection events over fixed durations of time starting from the pulsed laser enable, the histogram processor forming a threshold detection level from previous measurements, and optionally, an alarm being generated when particular histogram bins exceed the threshold level.

A second object of the invention is an apparatus and method for measurement of temperatures along a series of localized regions along a single optical fiber, the apparatus comprising a pulsed optical source coupled to an optical fiber having a plurality of sensing regions formed by coiled, spiral, or helical (or any coiled forms having circular, elliptical, or other curved geometrical cross sections) sections of optical fiber, the apparatus including an estimator for measurement of temperature in sensing regions by counting Stokes and anti-Stokes photon detections (or measuring the optical intensities of Stokes and anti-Stokes backscattered signals) during a series of gated count events, the Stokes and anti-Stokes optical wavelengths directed to one or more photon counters or ultra-sensitive photodetectors, the photon counters or ultra-sensitive photodetectors operative to accumulate photon counts or optical flux associated with particular time windows corresponding to sensor regions of the optical fiber, the apparatus estimating a temperature using the respective Stokes and anti-Stokes photon counts or optical flux measurements during each histogram time window.

SUMMARY OF THE INVENTION

An apparatus provides for the high resolution spatial measurement of temperature in one or more sensing regions of optical fiber sensor having loops or spirals or cylindrical or helical (having circular, elliptical, or any other curved geometrical coil cross sections) fiber coils to yield shortened regions of time-dependent temperature measurement with enhanced spatial resolution. Each fiber coil region provides enhanced spatial resolution for temperature measurement by creating a large fiber length to the coil axis length ratio (i.e., the length of the optical fiber in the coiled region can be a factor of about 10 to a factor of about 1000 or more longer than the axial dimension of the fiber coil). The temperature measurement system has a repetitive pulsed laser source responsive to an enable signal or modulation signal from a controller. The pulsed laser output is coupled to an optical circulator input port which couples the pulsed laser output to a bidirectional port, where it is coupled to a reference optical fiber length or loop in series with a measurement or sensing optical fiber having a series of sensing regions, each sensing region comprising one or more measurement loops or coils, the measurement fiber also carrying Raman backscattered (counter-propagating) optical energy from each sensing region through the reference fiber loop, through the optical circulator and to a circulator signal output port. In a first example of the invention, the circulator signal output port is coupled through a first path to a Stokes optical filter at a wavelength greater than the laser source center wavelength, or through a second path to an anti-Stokes filter at a wavelength less than the laser source center wavelength. The outputs of the Stokes optical filter and anti-Stokes optical filter are coupled to a photon counter or an ultra-sensitive photodetector, which is coupled to a histogram processor which synchronizes the collection of photon counts (or measured optical fluxes) in the count or flux (or intensity) bins to the controller pulsed laser enable assertion, thereby generating a time-dependent histogram containing Stokes and anti-Stokes photon counts (or measured optical fluxes) with a time relationship to the laser enable or modulation assertion, the histogram thereby associating each photodetector response with a distance from the optical source along the measurement fiber.

In a second example of the invention, the optical circulator output port is coupled to a Stokes optical filter and also an anti-Stokes optical filter, each optical filter output coupled to a respective Stokes photon counter (or ultra-sensitive photodetector) and anti-Stokes photon counter (or ultra-sensitive photodetector) of identical sensitivity. The Stokes optical filter and anti-Stokes optical filter coupled to the optical circulator output port preferably direct the Stokes and anti-Stokes optical wavelengths to the respective photon counters (or ultra-sensitive photodetectors) with minimal losses.

For the first or second example of the invention, a reference set of histogram counts is acquired during an operational period, thereby establishing a baseline level for sensor calibration purposes. Recently acquired histograms are compared to either a baseline level or a calibration level over each count extent, and an alarm indicator is provided if a photon count (or optical flux) exceeds the threshold for a particular count or flux extent. The Stokes and anti-Stokes photon counts or optical flux intensities from the reference fiber loop combined with a local temperature measurement of the reference fiber loop may be used to establish a calibration factor for use in estimating temperatures of the measurement sensors as well as determining any calibration constants of the temperature estimation algorithm.

BRIEF DESCRIPTION OF THE DRAWINGS

FIG. 10D-1 is a cross section view of FIG. 10D.

DETAILED DESCRIPTION OF THE INVENTION

Figure 1A:
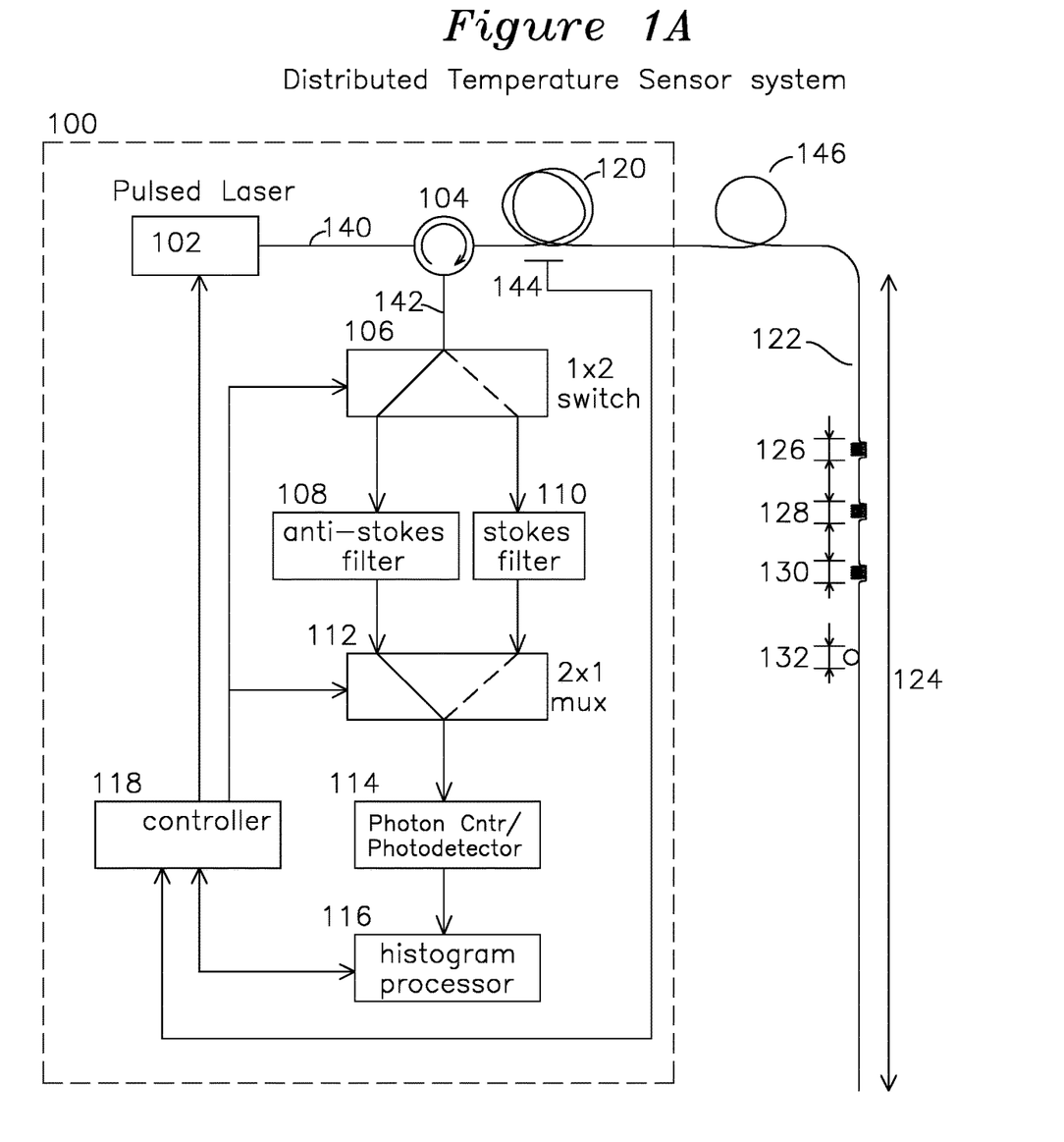
FIG. 1A shows the block diagram for a first example of a Raman distributed temperature sensing (DTS) system.

FIG. 1A shows a Raman back-scattered distributed temperature sensor (DTS) system 100 which includes a pulsed laser 102 for generating high-intensity short bursts of optical energy at a suitable wavelength. A suitable wavelength includes a wavelength in the spectral range of visible to infrared band, where the transmission loss of silica optical fiber is relatively small or negligible (i.e., in the ~600 nm to ~1600 nm range, particularly in the spectral windows with the lowest dB loss values per kilometer; for instance, approximately 800 to 900 nm, approximately 1300 to 1350 nm, and approximately 1450 to 1650 nm. The pulsed laser 102 may further comprise a continuous laser source of high optical purity modulated by electrical modulation or switching for gating or generating ultra-short pulses of optical energy from the laser source 102 to the output optical fiber 140. The temporal pulses of optical energy from the pulsed laser source are preferably short enough while propagating in the optical fiber to allow the spatial resolution of one temperature sensing region from another. The optical pulse from output fiber 140 then travels to optical circulator 104, through optical reference fiber coil 120, through any coupling lead 146 to temperature measurement fiber 122 which spans a measurement region 124. The measurement region 124 in prior art DTS systems may typically have a length in the range of hundreds of meters to tens of kilometers. Temperature-related Raman backscatter is dependent on the local temperature of the optical fiber in the backscattering measurement region 124 and causes a small amount of Raman backscattered optical energy to be returned from measurement fiber 122 through coupling lead 146, through reference optical coil 120, where it is directed through circulator 104 output port 142.

FIG. 1A shows a first example of the invention, where the backscattered optical energy is directed to 1×2 (1 by 2) optical switch 106. Sensing regions 126, 128, and 130 are formed from optical fiber windings or coils such as spiral, helical, or fiber loops 132 (with circular, elliptical, or any curve-shaped core cross sections) which provide regions of shortened spatial lengths (or shortened axial lengths), providing a large ratio of coil fiber length to coil axial length, the ratio being in the range of about 10 to 1000, with higher ratios providing further enhanced spatial resolution for temperature measurement. The use of a large ratio of fiber length to axial length provides for temperature measurement in regions which are significantly reduced in extent compared to straight optical fiber of the prior art, thereby providing enhanced spatial resolution for distributed temperature measurements. In some examples of the invention, the helical windings (such as cylindrically coiled fiber windings, or fiber windings with circular or non-circular core cross sections) or loops may be disposed about a form made from silica, quartz, or metal formed into a rod, tube, or cylinder. Other form material options include the family of ceramics, including alumina, boron nitride, or aluminum nitride; composite materials such as fiber-reinforced plastics (FRP), including glass-filled polymeric composites, high-temperature plastics with a melting temperature above 200° C. or 300° C. such as PolyEtherEtherKetone (PEEK), silicon, or another high temperature material. The preferred form material is lightweight and capable of withstanding the maximum expected temperatures in the use environments. The 1×2 optical switch 106 coupling the output port 142 to either the anti-Stokes optical filter 108 or Stokes optical filter 110 is controlled by the controller 118, which directs backscattered optical energy from output port 142 through the selected optical filter 108/110 and time-division multiplexer 112 to a photon counter or ultra-sensitive photodetector 114, which may be a single-photon counting module (SPCM) or other suitable sensitive detector. Anti-Stokes optical filter 108 and Stokes optical filter 110 are optical filters for wavelengths slightly smaller or larger than the center wavelength of the pulsed laser 102, respectively, and matched to the associated backscattered anti-Stokes and Stokes wavelengths. Photodetector (or SPCM) 114 measures returning optical energy in one example embodiment using an avalanche photo-diode (APD) photodetector, and the photon count versus time response is acquired and stored in a plurality of photon count bins in time-dependent histogram processor 116 which associates the photodetector event to a position along the optical fiber. Controller 118 provides an enable signal (or electrical modulation signal) to pulsed laser source 102, selects the optical path which precedes the photon detector or ultra-sensitive photodetector 114, which passes through either the anti-Stokes optical filter 108 or Stokes optical filter 110 according to the path selections of 1×2 optical switch 106 or 2×1 multiplexer (time-division multiplexer or mux) 112.

Figure 1B:
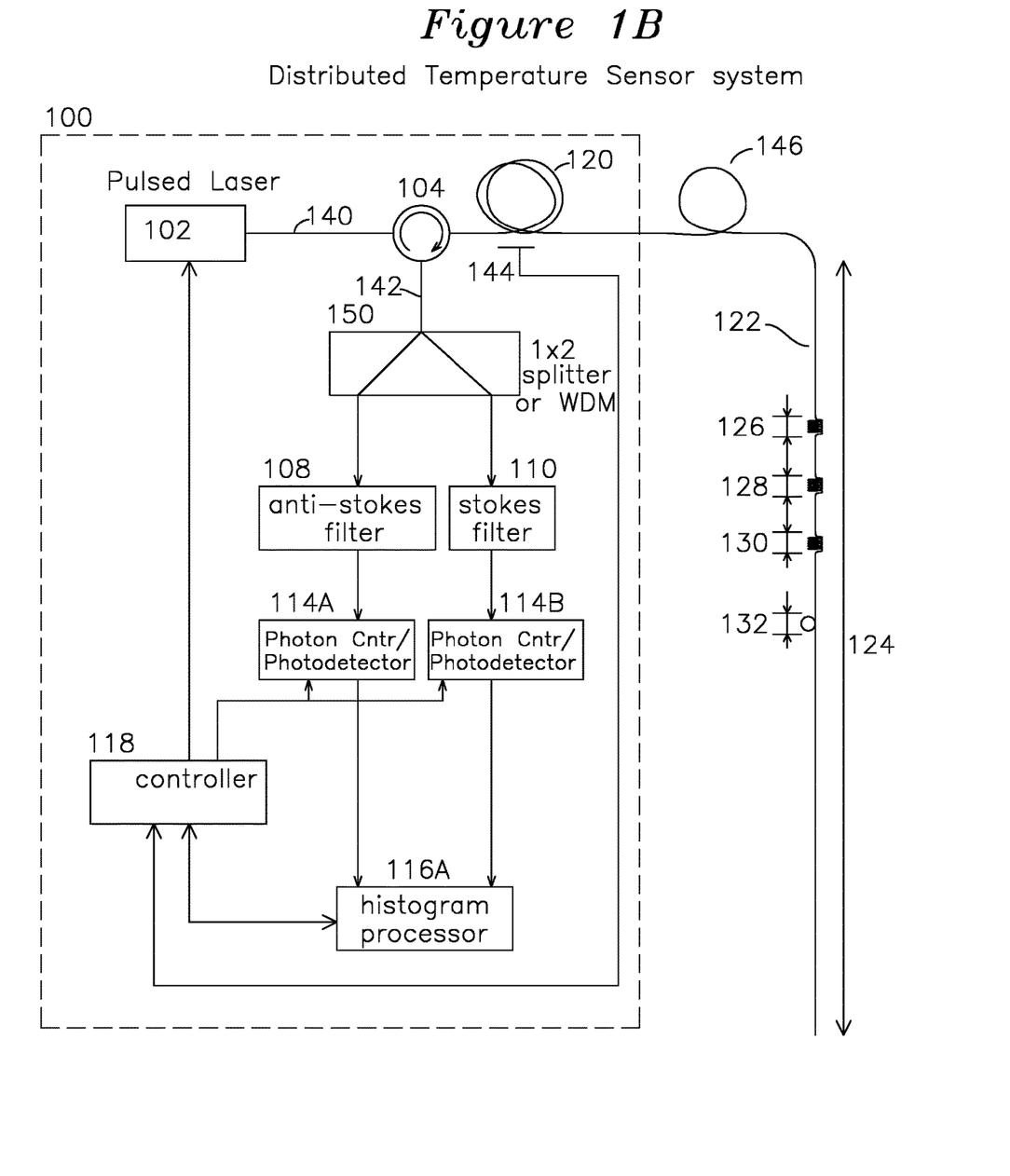
FIG. 1B shows the block diagram for a second example of a Raman DTS system.

FIG. 1B shows a second example of the DTS system 100, where the corresponding reference numbers in any given figure perform the same function as shown in other figures. Output port 142 is directed to optical splitter 150 which splits and directs the backscattered signal into two output channels: one connected to anti-Stokes optical filter 108 and thereafter to photon counter or ultra-sensitive photodetector 114A, and the other one connected and to Stokes optical filter 110 and thereafter to photon counter or ultra-sensitive photodetector 114B. Alternatively, the splitter 150 may be a wavelength division multiplexer (WDM) splitter separating the Stokes and Anti-Stokes wavelengths and directing each wavelength range to the respective photon counters 114A/114B, optionally through filters 108 and 110. For most accurate performance, the characteristics of photodetectors 114A and 114B should be well matched to each other for noise performance and gain. The advantage of the system of FIG. 1B is that it eliminates the need for the 1×2 optical switch and the time-division multiplexing function, and the anti-Stokes photon counter or photodetector 114A and Stokes photon counter or photodetector 114B are simultaneously operative, rather than exclusively operating at different time intervals as in FIG. 1A, thereby improving the overall DTS system performance and reliability.

The DTS measurement system 100 may be formed from individual optical components, or it may be formed as a photonic integrated circuit using waveguides formed from Silicon Nitride on a Silicon substrate, for example.

Figures 2, 3:
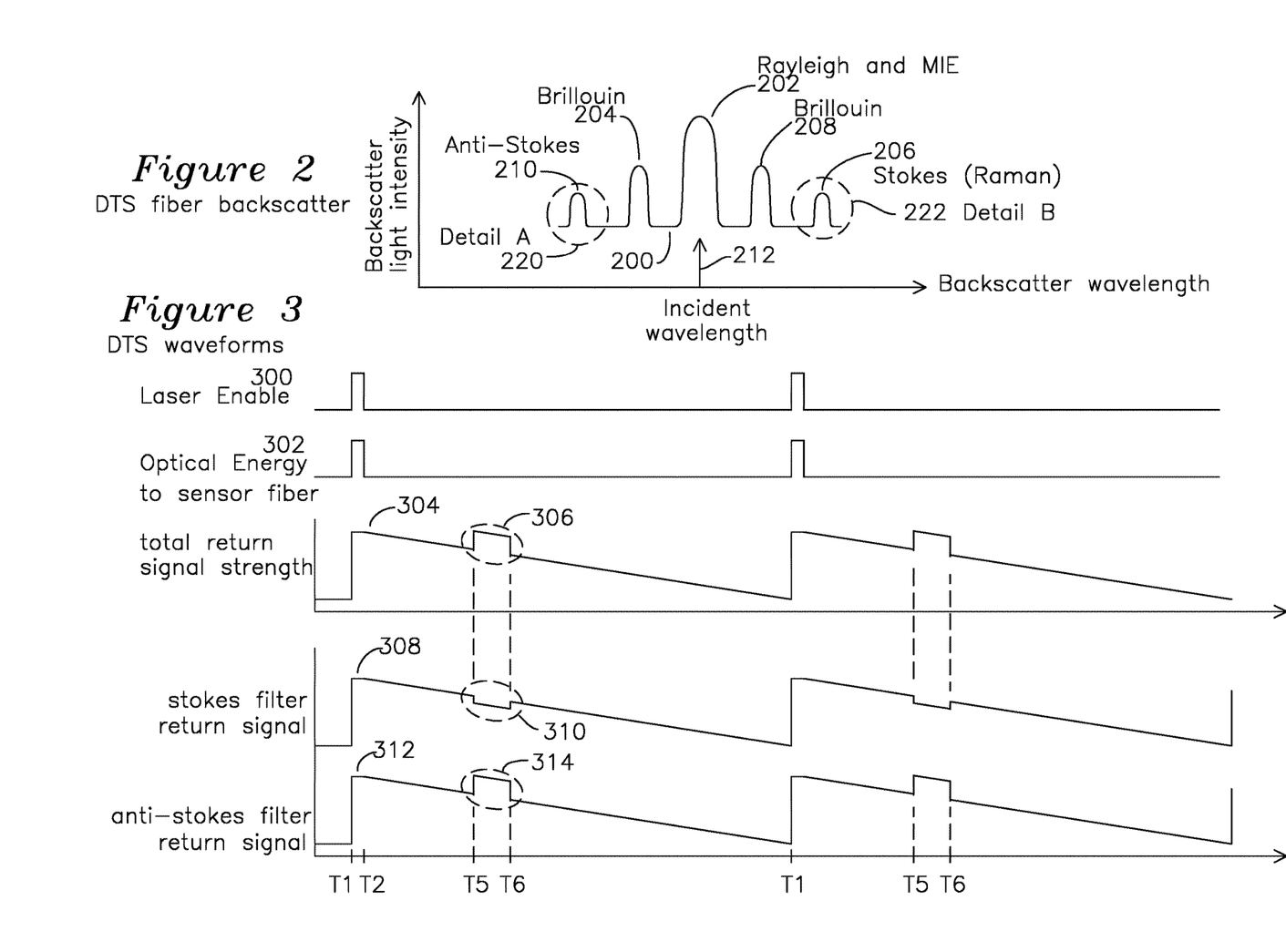
FIG. 2 shows a Raman backscatter spectral response plot including Stokes and anti-Stokes wavelengths.
FIG. 3 shows representative waveforms of operation for the distributed temperature sensing system of FIG. 1.
Figure 4:
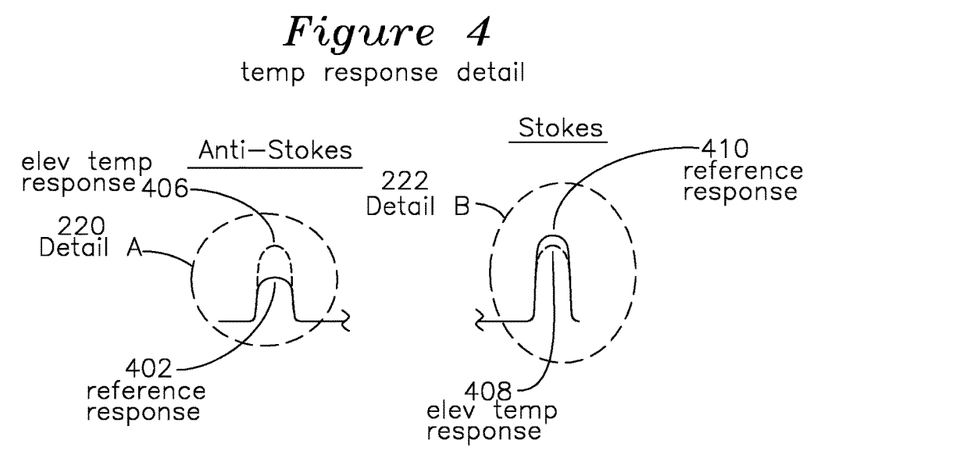
FIG. 4 shows temperature response detail for the backscatter plots of FIG. 2, showing the Stokes and anti-Stokes signals.

FIG. 2 shows the DTS sensor fiber Raman backscatter spectral distribution and signal wavelengths for measurement sensor pulsed laser source center wavelength 212, which generates a wavelength-dependent backscatter response 200 which includes backscatter responses from Rayleigh backscatter 202 which may be referenced to incident wavelength 212, including Brillouin backscatter 208 at a larger wavelength, Brillouin backscatter 204 at a smaller wavelength, anti-Stokes backscatter 210 at a smaller wavelength, and Stokes backscatter 206 at a larger wavelength. When a spatial sensing region of the optical fiber is increased in temperature, the backscatter of the anti-Stokes response 210 increases as a comparatively strong function of temperature (since the anti-Stokes signal is strongly temperature dependent), and the backscatter of the Stokes response 206 decreases as a comparatively weak function of temperature (since the Stokes signal is weakly temperature dependent). More anti-Stokes photons are produced than Stokes photons when the fiber temperature increases. FIG. 4 shows the temperature response detail, including anti-Stokes region detail A 220 and Stokes region detail B 222 of FIG. 2 showing the effect on backscatter at those wavelengths from an increased temperature region of the optical sensing fiber 122. Examining FIG. 4 Stokes detail 220, it can be seen that the reference temperature anti-Stokes wavelength backscatter signal 402 increases 406 in the region of fiber with an elevated temperature (strongly temperature dependent), whereas the Stokes region 222 has a comparatively decreased backscatter response 408 with respect to the reference response 410 in the region of fiber with an elevated temperature (weakly temperature dependent). Anti-Stokes backscatter increase (402 to 406) is comparatively larger than the Stokes backscatter decrease (410 to 408) in the sensor region (due to the strong and weak dependencies of the backscattered anti-Stoke and Stoke signals, respectively). The backscatter response is a small fraction of optical excitation energy applied to the fiber by pulsed optical source 102, so it is necessary to accumulate or integrate backscatter photon statistics over an interval of time, and for making measurements over different sensor regions of fiber using time-of-flight methods for each optical pulse, to maintain backscatter photon counts in histogram count bins which correspond to length ranges of the fiber providing the Raman backscatter responses. Upon sufficient histogram count levels and sufficiently short duration optical pulses incident into the optical fiber, it is possible to resolve relative temperature in the fiber based on the ratio of the anti-Stokes backscatter signal to the Stokes backscatter signal, and time of arrival for those photon counts with respect to the laser pulses in time.

Suitable optical fiber for use in the present DTS system includes multi-mode optical fiber for total sensor fiber lengths on the order of up to about 50 km, and single-mode optical fiber for total sensor fiber lengths up to in excess of 50 km. Single-mode optical fiber has a waveguide core diameter of approximately 10 µm or less, with a numerical aperture (NA) of about 0.1, whereas multi-mode optical fiber has a waveguide core diameter of about 50 µm, 62.5 µm, or 100 µm with a NA of about 0.2. Because the DTS system typically operates with the waveguide core carrying a maximum possible waveguide core optical energy density, and the maximum optical energy density goes as (core diameter*NA)$^2$, an example 100 µm multi-mode fiber is able to operate at approximately 400 times greater input optical power than a 10 µm single-mode fiber.

The length of the measurement fiber is also governed by dispersion, which includes modal dispersion (different modes of the optical pulse propagating at different velocities) and chromatic dispersion (different wavelengths of the optical pulse propagating at different velocities). Modal dispersion is minimal in single-mode fiber compared to multi-mode fiber, and chromatic dispersion is also greater in multi-mode fiber. Because of the greater dispersion in multi-mode fiber, its use is contemplated for comparatively shorter lengths of sensing fiber 122 (compared to single-mode fiber).

The type of optical fiber 122 also depends on the temperature application. For instance, for high temperature applications, DTS optical fiber manufactured by Furukawa (www.ofsoptics.com) provides operating temperatures to 300° C. for multi-mode and single-mode optical fiber. AFL optics under the brand name Verrillon® also provides high-temperature optical fibers including VHM5000 and VHM7000 which provide extremely small bend radius less than 10 mm, which is suitable for coiled DTS sensors.

FIG. 3 shows the waveforms of operation of the temperature measurement unit 100. The controller issues laser enable 300 or modulation signal with a pulse duration from T1 to T2 which is sufficient to resolve a temperature sensing region of fiber, which may be reduced in extent by winding the optical fiber on a helical form or loops as shown in FIG. 1 with a fiber length to axial sensor length ratio in the range of about 10 to 1000 or more (higher ratios provide higher spatial resolution for DTS temperature measurement). For example, silica glass single-mode fiber having an index of refraction of 1.5 results in an optical propagation velocity of 20 cm/ns. A laser enable duration from T1 to T2 of 50 ns would produce an optical region with an illumination extent of 10 meters, traveling down the fiber at a rate of 20 cm/ns, thereby spatially resolving temperature measurements in sensor regions of about 10 meters of length, providing a spatial resolution of about 10 meters for temperature measurement in a respective sensor region. For an optical fiber wound with a pitch of 10 meters of fiber length per linear axial inch (fiber length to sensor extent ratio of approximately 400), the same sensor region may be shortened to 1 inch of extent, thereby providing improved spatial resolution of about 1 inch or 25 mm (substantially improved compared to a 10-meter spatial resolution). Because the backscatter response is the convolution of the temperature profile with the optical pulse profile, a region with an step-elevated temperature extending over 15 meters of sensor fiber (occupying an example 1.5 inch of sensor length) would thereby produce a reflected temperature response from T3 to T4 corresponding to 25 meters, or 125 ns for the example optical fiber. In various embodiments, the extent 124 of the DTS fiber depends on the attenuation of the optical fiber and wavelength and power of the source, and for an example extent 124 of 10 km in length, the T1 to T1 pulse repetition rate would be restricted to the round trip time-of-flight of approximately 100 μs Or a repetition rate of up to 10 kHz, such that DTS measurements returning from near the end of the fiber do not interfere with measurements at the start of the following period. The maximum repetition rate for the laser pulse is inversely proportional to the fiber length. For instance, for a 1 km fiber, the maximum laser pulse repetition rate is 100 kHz.

Figure 5:
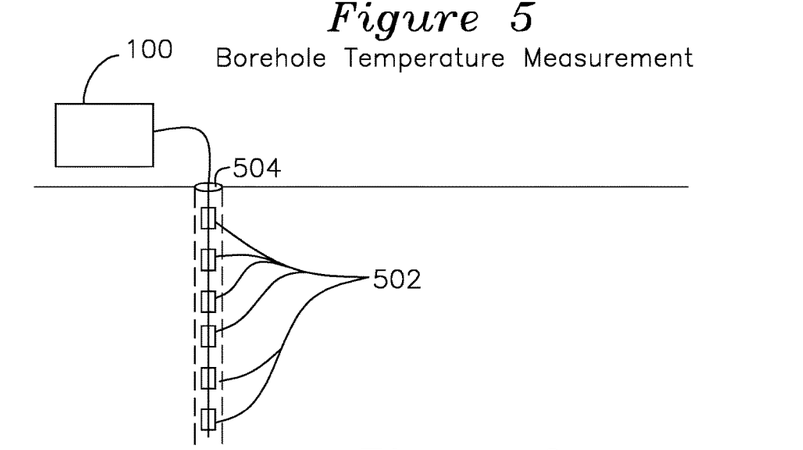
FIG. 5 shows the distributed temperature sensing (DTS) system of FIG. 1 used for measurement of temperature distribution in a borehole.
Figure 6:
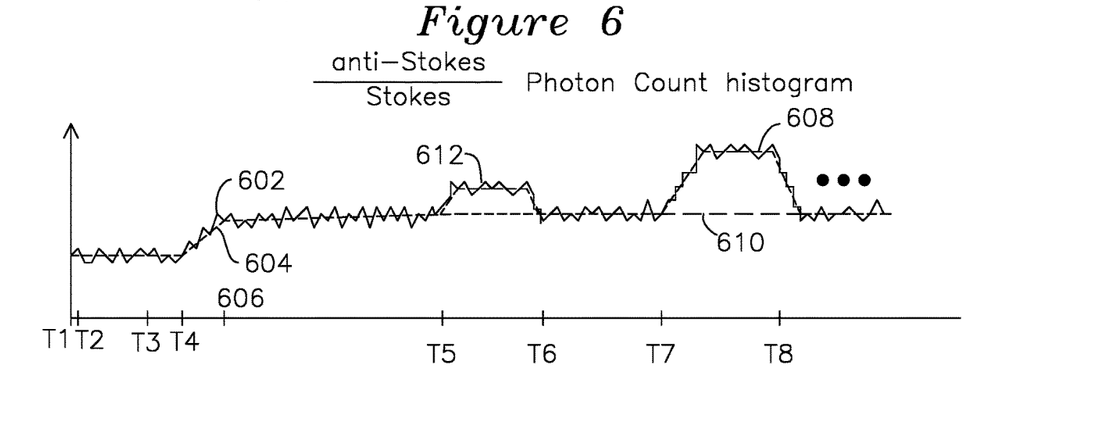
FIG. 6 shows a representative histogram curve for the distributed temperature sensing (DTS) system of FIG. 1 used in the example FIG. 5.

FIGS. 5 and 6 show the operation of the measurement system 100, 146, 122 in a borehole 504 into which has been inserted an optical fiber with several measurement regions formed as optical fiber wound on a helix or looped or coiled to shorten the measurement sensor length (large coil fiber length to coil axis length ratio). The previously described detector 100 with lead fiber 146 and sensor fiber 122 (which are typically different extents of the same fiber) is disposed through the length of the borehole for which temperature incidents are to be detected. Measurements are taken as was described earlier, with the photon counts or light flux for backscattered Stokes and for anti-Stokes signals aggregated into length-related count bins and weighing coefficients may be applied to the Stokes and anti-Stokes values which are used to calculate the ratio of anti-Stokes signal to Stokes signal histogram shown as ratio histogram waveform 602. The anti-Stokes/Stokes ratio histogram shown in FIG. 6 602 may be averaged temporally and spatially to form response curve 604. The time intervals T1, T2, T3, T4, T5, T6 shown for FIG. 6 relate to the earlier reference time points for FIG. 3. The interval T1 to T2 is shown for time scale reference as the excitation optical pulse, and the duration T3 to T4 represents the interval for which the backscatter optical energy is returning from reference coil 120 of FIG. 1. The temperature is shown increasing and stabilizing upon entry of the tunnel 504 at time 606 and through T5. change in temperature is shown 506, which is detected from T5 to T6 by the developed histogram, which has increased 608 above the datum 610 level.

Figure 7:
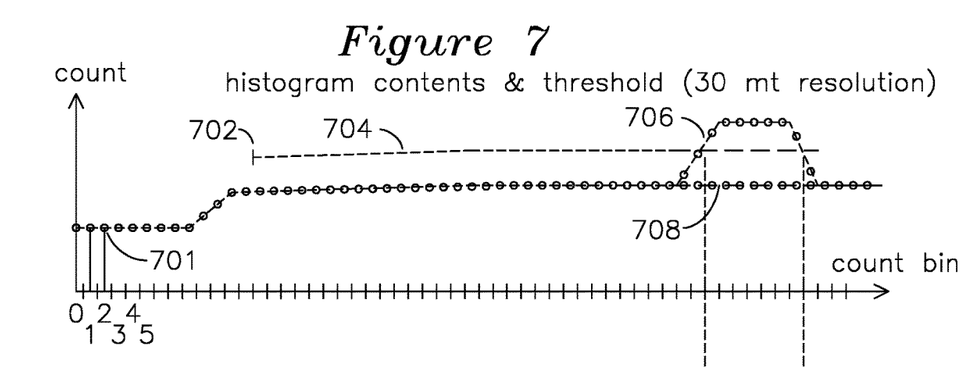
FIG. 7 shows representative histogram bins and contents, as well as a computed threshold level for the example of FIG. 5.
Figure 8:
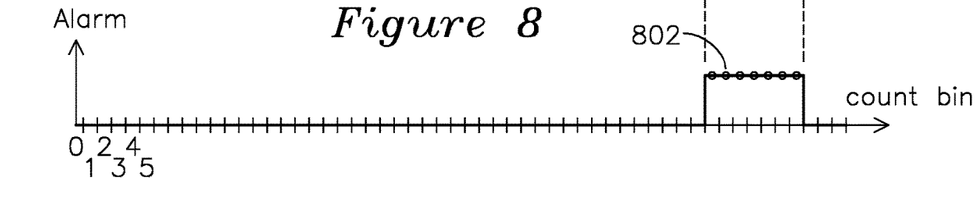
FIG. 8 shows the representative waveform for the output of the histogram processor of FIG. 7.

In one example of the invention, the temperature of a sensor region and associated histogram counts for the sensor region may be estimated from:

$$T_{sensorN} = k1\left(\frac{\sum PC_{sensorN(AS)}}{\sum PC_{sensorN(S)}} - k2\frac{\sum PC_{refloop(AS)}}{\sum PC_{refloop(S)}}\right)$$

where $T_{sensorN}$ is the temperature estimate of measurement sensor N;

$\Sigma PC_{sensorN(AS)}$ is the sum of photon counts in the anti-Stokes histogram bins associated with sensor N;

$\Sigma PC_{sensorN(S)}$ is the sum of photon counts in the Stokes histogram bins associated with sensor N;

k1 and k2 are calibration constants;

$\Sigma PC_{refloop(AS)}$ is the sum of photon counts in the anti-Stokes histogram bins associated with the reference loop;

$\Sigma PC_{refloop(S)}$ is the sum of photon counts in the Stokes histogram bins associated with the reference loop;

FIG. 7 shows an example histogram with threshold for a 30 meter resolution. The photodetector 114 of FIG. 1 may generate photon counts such as in Geiger mode, and the counts may occur with a variable time delay after the laser enable pulse. The histogram count bins provide a means of placing counts over a continuous interval of time into discrete bins with respect to the laser enable pulse. In this manner, over an interval of time, a baseline 708 is established for counts along the extent of the fiber. From the baseline, a threshold level 704 may be generated which provides a trigger point, such that counts which exceed this average rate trigger an alarm which may locate the region of elevated temperature, shown for the borehole of FIG. 5 and response T5 and T6 as points 706 which may be used to accurately describe a temperature, or used in combination with threshold 704 to generate alarm output 802 indicating the spatial position and extent of the event.

Figure 9:
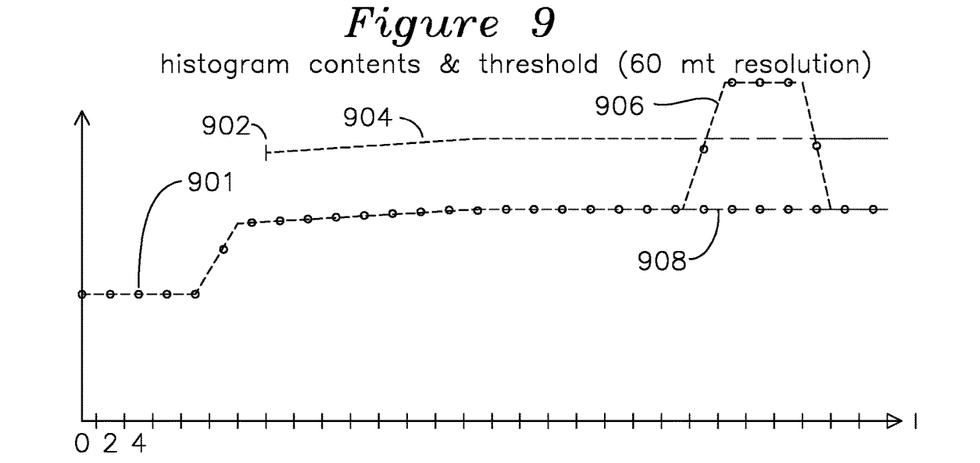
FIG. 9 shows the histogram for FIG. 7 where the resolution is halved and the count per histogram bin is doubled.

FIG. 9 shows the relationship between signal strength and resolution. As the resolution is doubled from 30 meter to 60 meter, number of bins is halved, and the number of counts in each bin increases, which may be used either to reduce the number of counts to establish threshold 904, or to improve the signal to noise performance of the counts which are taken.

Figure 10A:
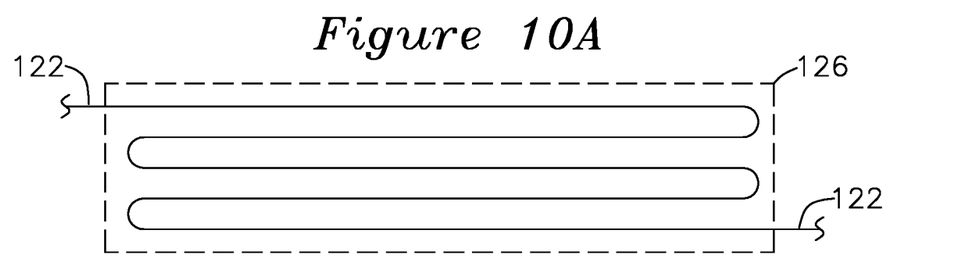
FIGS. 10A, 10B, 10C and 10D show views of various DTS sensor configurations.
Figure 10B:
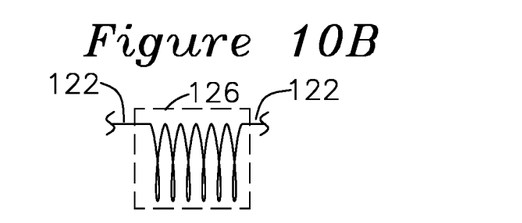
Figure 10C:
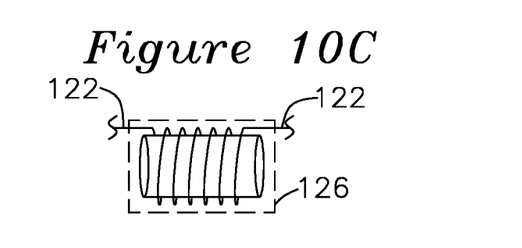
Figure 10D:
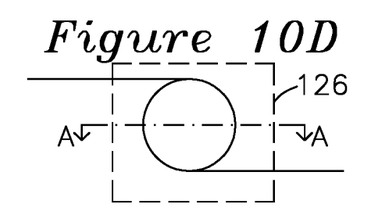
Figure 10D:
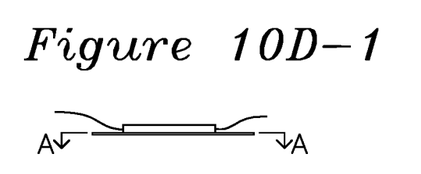

FIGS. 10A, 10B, 10C, and 10D show a variety of example physical configurations for the sensors 126, 128, 130, 132 of FIG. 1A or 1B, all sensors shown with reference number 126 for simplicity. The possible configurations for sensors having a fiber length to sensor length ration greater than 10 are not limited only to those shown. FIG. 10A shows a planar serpentine example, FIG. 10B shows an unconstrained coil or helical form, FIG. 10C shows a helical winding about a form as previously described, and FIG. 10D shows a cylindrical winding compressed to a low aspect ratio of height to width as shown in section view 10D-1. Each DTS sensor 126 may be of any form, typically the only limitation is the bend radius of the fiber for low loss operation, and the bend radius of each sensor type must selected for minimum loss of signal from the fiber core to the fiber cladding.

The ability to provide a single optical fiber 122 making measurements over a plurality of discrete segments 126, 128, 130, etc of FIG. 1 provides new measurement opportunities in certain settings that are otherwise difficult to perform. For example, in the semiconductor and solar industries, in-line and batch tube furnaces are used for processing silicon wafers, such as for annealing or growing surface oxides. The in-line or tube furnaces may be open ended or continuous, and in the range of 10 meters or longer, where it is important to maintain desired temperature profile over the extent of the furnace. Standard DTS measurement systems would not provide sufficient temperature spatial specificity for high-resolution temperature measurement and control of the furnace temperature profile. Using coils of about 100× to 400× fiber length to sensor extent ratio, it is possible to place multiple sensors on a single optical fiber over the extent of the tube furnace, providing substantially improved spatial resolution for temperature profile measurements.

The examples provided herein are for illustration only. While the sensing fiber 122 is shown as a single ended system, it is possible to couple a system 100 to each end of the optical fiber, such as by looping the optical fiber back to the point of origin. In this manner, it may be possible to synchronize the optical pulses from each system to capture backscatter on each end of the sensing fiber 122.

Use of the term "on the order of magnitude" is understood to be in the range of 0.10× to 10× the nominal value. Use of the term "approximately" is understood to be in the range of ¼× to 4× for a length, or +/−30° angle variation, use of the term "about" is understood to be in the range of +/−50% of the nominal value, and use of the term "substantially" is understood to provide a variation in the system which allows the desired function of the system to be maintained.

We claim:

1. A system for the detection of temperature increase of a segment of an optical fiber, the system having:
    a laser optical source enabled by a controller, the laser optical source generating at least one pulse of optical energy in response to a pulsed laser enable input;
    a circulator having an optical input port coupled to said laser output, a bidirectional port coupling energy from an optical output of said laser to a reference loop and to a measurement optical fiber having one or more sensor regions, each said sensor region having a ratio of optical fiber length to sensor extent of at least 10, each said sensor region generating temperature-dependent backscatter optical energy;
    said backscatter optical energy directed by said circulator bidirectional port to a signal port of the circulator;
    one or more photodetectors coupled to said signal port through an anti-Stokes optical filter and/or a Stokes optical filter;
    each said one or more photodetectors coupled to a histogram processor, said histogram processor having a plurality of counters which extend over a count extent, each said count extent associated with a delay time interval associated with a pulsed laser enable;
    whereby said histogram processor estimates the temperature of a sensor region by comparing a photodetector response at the output of an anti-Stokes filter with the photodetector response at the output of the Stokes filter.

2. The system of claim 1 where the temperature estimate includes comparison of the photodetector response of the measurement optical fiber with the photodetector response of the reference loop.

3. The system of claim 1 where the signal port is alternatingly coupled to a single photodetector through an anti-Stokes filter during a first interval, and the signal port is coupled to the single photodetector through a Stokes filter during a second interval.

4. The system of claim 1 where the signal port is coupled to a wavelength filter having an anti-Stokes backscatter output and a Stokes backscatter output, the anti-Stokes backscatter output coupled to an anti-Stokes photodetector, the Stokes backscatter output coupled to a Stokes photodetector.

5. The system of claim 4 where the anti-Stokes photodetector includes an anti-Stokes optical filter selectively passing anti-Stokes optical wavelengths and the Stokes photodetector includes a Stokes optical filter selectively passing Stokes optical wavelengths.

6. The system of claim 1 where the at least one pulse is a plurality of pulses, each pulse having a temporal duration corresponding to a spatial extent of a sensing region.

7. The system of claim 6 where the histogram processor is operative over acquired data corresponding to each of the corresponding spatial extents of the sensing regions.

8. The system of claim 1 where at least one of the one or more sensor regions comprises: an optical fiber formed into a loop, an optical fiber formed into a helix, or an optical fiber formed about a cylinder.

9. The system of claim 1 where the sensor region comprises an optical fiber wound around a form.

10. The system of claim 9 where the form comprises at least one of: quartz, silica, metal, alumina, boron nitride, aluminum nitride, a fiber reinforced plastic, or a high temperature plastic.

* * * * *